United States Patent
Rekken

(10) Patent No.: US 11,466,037 B2
(45) Date of Patent: Oct. 11, 2022

(54) CATALYSIS OF DEHYDROCOUPLING REACTIONS BETWEEN AMINES AND SILANES

(71) Applicant: Jiangsu Nata Opto-Electronic Materials Co. Ltd., Jiangsu (CN)

(72) Inventor: Brian D. Rekken, Midland, MI (US)

(73) Assignee: Nata Semiconductor Materials Co., Ltd., Chuzhou (CN)

( * ) Notice: Subject to any disclaimer, the term of this patent is extended or adjusted under 35 U.S.C. 154(b) by 354 days.

(21) Appl. No.: 16/669,560

(22) Filed: Oct. 31, 2019

(65) Prior Publication Data

US 2021/0130374 A1 May 6, 2021

(51) Int. Cl.

| | | |
|---|---|---|
| *C07F 7/10* | (2006.01) | |
| *B01J 31/02* | (2006.01) | |
| *B01J 27/138* | (2006.01) | |
| *B01J 31/12* | (2006.01) | |

(52) U.S. Cl.
CPC .............. *C07F 7/10* (2013.01); *B01J 27/138* (2013.01); *B01J 31/0232* (2013.01); *B01J 31/122* (2013.01); *B01J 2231/44* (2013.01); *B01J 2531/26* (2013.01)

(58) Field of Classification Search
CPC ........ C07F 7/10; B01J 27/138; B01J 31/0232; B01J 31/122; B01J 2231/44; B01J 2531/26
See application file for complete search history.

(56) References Cited

U.S. PATENT DOCUMENTS

| | | | | |
|---|---|---|---|---|
| 5,047,526 A | * | 9/1991 | Yamamoto | C07F 7/1896 540/200 |
| 10,030,037 B2 | * | 7/2018 | Rekken | H01L 21/02219 |
| 10,030,038 B2 | * | 7/2018 | Rekken | C07F 7/126 |
| 10,647,734 B2 | * | 5/2020 | Rekken | B01J 31/0271 |
| 2015/0246937 A1 | * | 9/2015 | Xiao | C07F 7/10 556/406 |
| 2020/0140618 A1 | * | 5/2020 | Gohndrone | C08G 77/08 |

FOREIGN PATENT DOCUMENTS

JP 2011207876 A * 10/2011

OTHER PUBLICATIONS

T. Tsuchimoto et al., 18 Chemistry a European Journal, 9500-9504 (2012) (Year: 2012).*
L. Greb et al., 50 Chem. Commun., 2318-2320 (2014) (Year: 2014).*
C. Konigs et al., 49 Chem. Commun., 1506-1508 (2013) (Year: 2013).*
K. Kucinski et al., 9 ChemCatChem, 1868-1885 (2017) (Year: 2017).*
S. Anga et al., 8 ChemCatChem, 1373-1378 (2016) (Year: 2016).*
S. Antoniotti et al., 49 Angew. Chem. Int. Ed., 7860-7888 (2010) (Year: 2010).*
K. Yonekura et al., 36 Organometallics, 3242-3249 (2017) (Year: 2017).*
International Union of Pure and Applied Chemistry, Compendium of Chemical Terminology, Gold Book (2012) (Year: 2012).*
F. Palumbo et al., 102 Helv. Chim. Acta. (2019) (Year: 2019).*
CAS/CASREACT Abstract and Indexed Reactions, T. Tsuchimoto, JP 2011207876 (2011) (Year: 2011).*
K. Takaki et al., 64 Journal of Organic Chemistry, 3891-3895 (1999) (Year: 1999).*
Hill, et al, "Hetero-dehydrocoupling of silanes and amines by heavier alkaline earth catalysis", Chemical Science, 2013, pp. 4212-4222, vol. 4.
Tsuchimoto, et al, "Zinc-catalyzed dehydrogenative n-silylation of indoles with hydrosilanes", Chemistry—A European Journal, Jul. 2012, pp. 9500-9504, vol. 18, No. 31.
International Search Report for corresponding International Application No. PCT/US2017/063590 dated Jan. 24, 2018.

* cited by examiner

*Primary Examiner* — Alexander R Pagano
(74) *Attorney, Agent, or Firm* — Morgan, Lewis & Bockius LLP

(57) ABSTRACT

A method for dehydrocoupling silanes and amines. The method comprises contacting: (a) an aliphatic amine; (b) a silane; and (c) a catalyst which is $ZnX_2$, wherein X is alkyl, chloride, bromide, iodide, trifluoromethanesulfonate, bis(trifluoromethane)sulfonamide, tosylate, methanesulfonate or $O_3S(CF_2)_xCF_3$ wherein x is an integer from 1 to 10.

4 Claims, No Drawings

CATALYSIS OF DEHYDROCOUPLING REACTIONS BETWEEN AMINES AND SILANES

This application is a divisional of U.S. application Ser. No. 16/340,431, filed on Apr. 9, 2019, which claims the benefit of International Application PCT/US2017/063590, filed on Nov. 29, 2017, which claims the benefit of U.S. application Ser. No. 62/439,239, filed on Dec. 27, 2016.

This invention relates to a method for catalyzing dehydrocoupling reactions between amines and silanes.

Dehydrocoupling reactions catalyzed by zinc triflate are known for a very limited range of compounds, as reported in T. Tsuchimoto et al., *Chem. Eur.*, 2012 (18) 9500.

The problem solved by this invention is the need for a dehydrocoupling method useful for a broader range of compounds.

STATEMENT OF THE INVENTION

The present invention provides a method for dehydrocoupling silanes and amines. The method comprises contacting: (a) an aliphatic amine; (b) a silane; and (c) a catalyst which is $ZnX_2$, wherein X is alkyl, chloride, bromide, iodide, trifluoromethanesulfonate, bis(trifluoromethane)sulfonamide, tosylate, methanesulfonate or $O_3S(CF_2)_xCF_3$ wherein x is an integer from 1 to 10.

The present invention further provides a method for dehydrocoupling silanes and amines. The method comprises contacting: (a) an amine; (b) a perhydridosilane; and (c) a catalyst which is $ZnX_2$, wherein X is X is alkyl, chloride, bromide, iodide, trifluoromethanesulfonate, bis(trifluoromethane)sulfonamide, tosylate, methanesulfonate or $O_3S(CF_2)_xCF_3$ wherein x is an integer from 1 to 10.

DETAILED DESCRIPTION

Percentages are weight percentages (wt %) and temperatures are in ° C. unless specified otherwise. Operations were performed at room temperature (20-25° C.) unless specified otherwise. An organic substituent group is a group having from 1 to 20 carbon atoms and comprising no other atoms except for hydrogen, oxygen, nitrogen, sulfur, phosphorus and halides. An aliphatic organic substituent group is an organic substituent group having no aromatic rings. Aliphatic hydrocarbyl groups are substituent groups derived from $C_1$-$C_{20}$ aliphatic hydrocarbons by removal of a hydrogen atom. Preferably, aliphatic hydrocarbyl groups are straight or branched. Alkenyl groups are aliphatic hydrocarbyl groups having at least one carbon-carbon double bond. Preferably, an alkenyl group has one carbon-carbon double bond. An alkyl group is a saturated $C_1$-$C_{20}$ hydrocarbyl group that may be straight or branched. An aliphatic heterohydrocarbyl group is an aliphatic hydrocarbyl group in which at least one methylene group has been replaced by O, S or NR, wherein R is an aliphatic hydrocarbyl group or a substituted aliphatic hydrocarbyl group. A substituted aliphatic hydrocarbyl group is an aliphatic hydrocarbyl group substituted by one or more alkoxy, trimethylsilyl, dialkylamine, thiol, alkylthiol and dialkylphosphino groups.

An aliphatic amine is an amine which does not contain an aromatic ring that is part of a substituent group attached to a nitrogen atom nor a nitrogen atom which is part of an aromatic ring. An aliphatic amine has at least one hydrogen atom bonded to a nitrogen atom. Preferably, an aliphatic amine has only one hydrogen atom bonded to a nitrogen atom. Preferably, an aliphatic amine comprises from 1 to 20 carbon atoms; preferably at least 2, preferably at least 3, preferably at least 4, preferably at least 5; preferably no more than 15, preferably no more than 12, preferably no more than 10, preferably no more than 9. Preferably, an aliphatic amine comprises only one nitrogen atom. Preferably, an aliphatic amine has the structure $NR^1R^2H$, in which $R^1$ and $R^2$ independently are aliphatic organic substituents and $R^1$ and $R^2$ may be interconnected to form a ring structure. Preferably, $R^1$ and $R^2$ are $C_1$-$C_{10}$ aliphatic organic substituents, preferably $C_1$-$C_6$, preferably $C_1$-$C_4$. Preferably, $R^1$ and $R^2$ independently are hydrocarbyl, substituted hydrocarbyl, heterohydrocarbyl or substituted heterohydrocarbyl. Preferably, $R^1$ and $R^2$ independently are $C_1$-$C_{10}$ substituents, preferably $C_1$-$C_6$, preferably $C_1$-$C_4$. Preferably, $R^1$ and $R^2$ independently are alkyl substituents each having from 1 to 10 carbon atoms ($C_1$-$C_{10}$ alkyl); preferably at least 2 carbon atoms; preferably no more than 8 carbon atoms, preferably no more than 6, preferably no more than four.

A silane is a compound having empirical formula $Si_n H_{2n+2}$, in which one or more hydrogen atoms may be replaced by organic substituent groups. Preferably, organic substituent groups have at least 2 carbon atoms; preferably no more than 15, preferably no more than 12, preferably no more than 9, preferably no more than 6. Preferably, organic substituent groups have no non-carbon atoms other than hydrogen and oxygen; preferably no more than 3 oxygen atoms, preferably no more than 2. In a preferred embodiment, organic substituent groups are aliphatic. In another preferred embodiment, organic substituent groups are aromatic, preferably aryl or aralkyl. Preferably, silanes have from 1 to 10 silicon atoms, preferably at least 2, preferably at least 3; preferably no more than 8, preferably no more than 6, preferably no more than 5. Especially preferred silanes include silane, disilane, trisilane and neopentasilane. A perhydridosilane is a silane containing only silicon and hydrogen.

An "amine," as that term is used in describing a method comprising contacting: (a) an amine; (b) a perhydridosilane; and (c) a catalyst which is $ZnX_2$, wherein X is alkyl, chloride, bromide, iodide, trifluoromethanesulfonate, bis(trifluoromethane)sulfonamide, tosylate, methanesulfonate or $O_3S(CF_2)_xCF_3$ wherein x is an integer from 1 to 10; includes aliphatic amines and aromatic amines, either of which must have at least one hydrogen atom bonded to the amine nitrogen atom. Preferably, an amine comprises from 1 to 30 carbon atoms; preferably at least 2, preferably at least 3, preferably at least 4, preferably at least 5; preferably no more than 20, preferably no more than 15, preferably no more than 12, preferably no more than 9. Preferably, an amine comprises only one nitrogen atom. Preferably, an amine is an aliphatic amine as defined herein.

Preferably, when the catalyst is $ZnX_2$, wherein X is $O_3S(CF_2)_xCF_3$, x is at least 2, preferably at least 3; preferably no more than 9, preferably no more than 8, preferably no more than 7, preferably no more than 6, preferably no more than 5. When X is alkyl, preferably the alkyl group has at least 2 carbon atoms; preferably no more than 10, preferably no more than 6, preferably no more than 4. Preferably, the catalyst is $ZnX_2$, wherein X is alkyl, chloride, iodide, trifluoromethanesulfonate or bis(trifluoromethane)sulfonimide; preferably alkyl, chloride, iodide or bis(trifluoromethane)sulfonimide.

In a preferred embodiment of the invention, a method for dehydrocoupling silanes and amines comprises contacting: (a) an amine; (b) a silane; and (c) a catalyst which is $ZnX_2$, wherein X is alkyl, chloride, bromide, iodide, bis(trifluoromethane)sulfonamide, tosylate, methanesulfonate or $O_3S(CF_2)_xCF_3$ wherein x is an integer from 1 to 10. Preferably, the silane has at least 2 silicon atoms, preferably at least 3; preferably no more than 10, preferably no more than 8, preferably no more than 6, preferably no more than 5.

In a preferred embodiment of the invention, a method for dehydrocoupling silanes and amines comprises contacting: (a) an amine; (b) a silane having at least two silicon atoms; and (c) a catalyst which is $ZnX_2$, wherein X is alkyl, chloride, bromide, iodide, trifluoromethanesulfonate, bis(trifluoromethane)sulfonamide, tosylate or methanesulfonate. The catalyst may also have X equal to $O_3S(CF_2)_xCF_3$ wherein x is an integer from 1 to 2; preferably 1. Preferably, the silane has at least three silicon atoms.

Preferably, reactants (a), (b) and (c) are heated at a temperature from 40 to 180° C.; preferably at least 60° C., preferably at least 80° C.; preferably no greater than 150° C., preferably no greater than 120° C. Preferably, the heating time is from 1 to 48 hours, preferably 3 to 18 hours. The proper heating time may easily be determined based on apparatus, other parameters, etc. Preferably, the product is purified by distillation. Preferably, the molar ratio of the amine reactant to the silane reactant is from 0.98:1 to 2:1, preferably 0.98:1 to 1.5:1, preferably 1:1 to 2:1, preferably 1:1 to 1.5:1, preferably 1.1:1 to 2:1, preferably 1.2:1 to 2:1, preferably 1.3:1 to 2:1.

Preferably, the reaction mixture comprising (a), (b) and (c) is substantially free of solvents other than the reactants; i.e., it comprises no more than 5 wt % solvent, preferably no more than 1 wt %, preferably no more than 0.5 wt %, preferably no more than 0.2 wt %. Preferably, the reaction mixture comprising (a), (b) and (c) is substantially free of nitrile solvents, e.g., acetonitrile; i.e., it comprises no more than 5 wt % nitrile solvents, preferably no more than 1 wt %, preferably no more than 0.5 wt %, preferably no more than 0.2 wt %.

The present invention is further directed to a composition for film forming, the composition comprising a product of the method of this invention and at least one of an inert gas, molecular hydrogen, a carbon precursor, nitrogen precursor, and oxygen precursor.

The present invention is further directed to a method of forming a silicon-containing film on a substrate, the method comprising subjecting a vapor of a silicon precursor comprising a product of the method of this invention to deposition conditions in the presence of the substrate so as to form a silicon-containing film on the substrate. The present invention is further directed to a film formed in accordance with the method.

The product of any of the methods disclosed herein may be used to form a silicon-heteroatom film by known techniques, including, e.g., physical vapor deposition, atomic layer deposition (ALD), or chemical vapor deposition (CVD). The physical vapor deposition method may comprise sputtering. Suitable sputtering methods include direct current (DC) magnetron sputtering, ion-beam sputtering, reactive sputtering, and ion-assisted sputtering. Typically, the deposition method comprises ALD or CVD. Preferably, the heteroatoms are selected from carbon, oxygen and nitrogen.

Suitable ALD methods include plasma enhanced atomic layer deposition methods (PEALD), spatial atomic layer deposition (SALD) and thermal atomic layer deposition (TALD) methods. When PEALD methods are employed, the plasma may be any one of the foregoing plasmas. The plasma may optionally further contain a carrier gas such as molecular nitrogen or argon gas. Plasmas are formed from plasma-forming gases, which may comprise a mixture of molecular nitrogen and molecular hydrogen.

Suitable CVD methods include simple thermal vapor deposition, plasma enhanced chemical vapor deposition (PECVD), electron cyclotron resonance (ECRCVD), atmospheric pressure chemical vapor deposition (APCVD), low pressure chemical vapor deposition (LPCVD), ultrahigh vacuum chemical vapor deposition (UHVCVD), aerosol-assisted chemical vapor deposition (AACVD), direct liquid injection chemical vapor deposition (DLICVD), microwave plasma-assisted chemical vapor deposition (MPCVD), remote plasma-enhanced chemical vapor deposition (RPECVD), atomic layer chemical vapor deposition (ALCVD), hot wire chemical vapor deposition (HWCVD), hybrid physical-chemical vapor deposition (HPCVD), rapid thermal chemical vapor deposition (RTCVD), and vapor-phase epitaxy chemical vapor deposition (VPECVD), photo-assisted chemical vapor disposition (PACVD), and flame assisted chemical vapor deposition (FACVD).

EXAMPLES

Example 1: A 250 mL high pressure Parr reactor (4576 HP/HT Pressure Reactor) was loaded with 0.25 g (0.40 mmol) of $Zn(NTf_2)_2$ and 17.01 g (168.10 mmol) of diisopropylamine in a glove box and then transferred to a fume hood. The reactor was connected to TEFLON-lined, flexible metal tubing connected to a pressurized cylinder of disilane, a cylinder of helium and a needle valve connected to a Schlenk line. All connections were pressure checked at 250 psi using helium. The reactor was then pressurized to ca. 15 psi of disilane. The reactor was then ramped over 1 h to 150° C. The reactor was held at 150° C. for 45 minutes. The reactor was allowed to cool to 70° C., held for 1 hour and then cooled to room temperature. The reactor had pressurized to ca. 115 psi when at room temperature. The excess pressure was eliminated through the Schlenk line. The reactor was brought into a glove box where the contents were collected. Sample composition was measured by GC-FID.

Example 2: A 250 mL high pressure PARR reactor (4576 HP/HT Pressure Reactor) was loaded with 0.25 g (0.40 mmol) of $Zn(NTf_2)_2$ and 17.00 g (168.00 mmol) of diisopropylamine in a glove box and then transferred to a fume hood. The reactor was connected to Teflon lined, flexible metal tubing connected to a pressurized cylinder of disilane, a cylinder of helium and a needle valve connected to a Schlenk line. All connections were pressure checked at 250 psi using helium. The reactor was then pressurized to ca. 20 psi of disilane. The reactor was then ramped over 25 minutes to 90° C. The reactor was held at 90° C. for 3 hours. The reactor pressure increased by ca. 55 psi. The reactor was then heated to 100° C. for 3 hours. The reactor was allowed to cool to ambient temperature over 2 hours. The excess pressure was eliminated through the Schlenk line. The reactor was brought into a glove box where 18.48 g of product was collected. Sample composition was measured by GC-FID.

Example 3: A 250 mL high pressure Parr reactor (4576 HP/HT Pressure Reactor) was loaded with 0.20 g (1.62 mmol) of $ZnEt_2$ and 17.01 g (168.10 mmol) of diisopropylamine in a glove box and then transferred to a fume hood. The reactor was connected to Teflon lined, flexible metal tubing connected to a pressurized cylinder of disilane, a cylinder of helium and a needle valve connected to a Schlenk line. All connections were pressure checked at 250 psi using helium. The reactor was then pressurized to ca. 20 psi of disilane. The reactor was then ramped over 25 minutes to 100° C. The reactor was held at 100° C. for 2 hours. The reactor was then ramped to 110° C. and held for 2 hours. The reactor was then ramped to 120° C. and held for 1 hour. The reactor was then allowed to cool to ambient temperature over 2 hours. The excess pressure was eliminated through the Schlenk line. The reactor was brought into a glove box where 17.10 g of product was collected. Sample composition was measured by GC-FID.

Example 4: A 250 mL high pressure Parr reactor (4576 HP/HT Pressure Reactor) was loaded with 0.10 g (0.16 mmol) of $Zn(NTf_2)_2$ and 7.01 g (69.28 mmol) of diisopropylamine in a glove box and then transferred to a fume hood. The reactor was connected to Teflon lined, flexible metal tubing connected to a pressurized cylinder of disilane, a cylinder of helium and a needle valve connected to a Schlenk line. All connections were pressure checked at 250 psi using helium. The reactor was then pressurized to ca. 20 psi of disilane. The reactor was then ramped over 25 minutes to 90° C. The reactor was held at 90° C. for 8 hours. The reactor was allowed to cool to ambient temperature over 2 hours. The excess pressure was eliminated through the Schlenk line. The reactor was brought into a glove box where 7.12 g of product was collected. Sample composition was measured by GC-FID.

Example 5: A 250 mL high pressure Parr reactor (4576 HP/HT Pressure Reactor) was loaded with 0.25 g (0.69 mmol) of $Zn(OTf)_2$ and 14.02 g (138.55 mmol) of diisopropylamine in a glove box and then transferred to a fume hood. The reactor was connected to Teflon lined, flexible metal tubing connected to a pressurized cylinder of disilane, a cylinder of helium and a needle valve connected to a Schlenk line. All connections were pressure checked at 250 psi using helium. The reactor was then pressurized to ca. 15 psi of disilane. The reactor was then ramped over 25 minutes to 100° C. The reactor was held at 100° C. for 2.5 hours. The pressure rose to 190 psi. The reactor was allowed to cool to ambient temperature over 2 hours. The excess pressure was eliminated through the Schlenk line. The reactor was brought into a glove box where ### g of product was collected. Sample composition was measured by GC-FID.

Example 6: A 250 mL high pressure Parr reactor (4576 HP/HT Pressure Reactor) was loaded with 0.25 g (0.78 mmol) of $ZnI_2$ and 14.01 g (138.45 mmol) of diisopropylamine in a glove box and then transferred to a fume hood. The reactor was connected to Teflon lined, flexible metal tubing connected to a pressurized cylinder of disilane, a cylinder of helium and a needle valve connected to a Schlenk line. All connections were pressure checked at 250 psi using helium. The reactor was then pressurized to ca. 15 psi of disilane. The reactor was then ramped over 25 minutes to 102° C. reaching a pressure of 65 psi. The reactor was held at 102° C. for 4.5 hours. The reactor was allowed to cool to ambient temperature over 2 hours. The excess pressure was eliminated through the Schlenk line. The reactor was brought into a glove box where 14.58 g of product was collected. Sample composition was measured by GC-FID.

Example 7: A 250 mL high pressure Parr reactor (4576 HP/HT Pressure Reactor) was loaded with 0.22 g (1.61 mmol) of $ZnCl_2$ and 14.02 g (138.55 mmol) of diisopropylamine in a glove box and then transferred to a fume hood. The reactor was connected to Teflon lined, flexible metal tubing connected to a pressurized cylinder of disilane, a cylinder of helium and a needle valve connected to a Schlenk line. All connections were pressure checked at 250 psi using helium. The reactor was then pressurized to ca. 15 psi of disilane. The reactor was then ramped over 3 hours to 150° C. The reactor was held at 150° C. for 3 hours. The reactor was allowed to cool to ambient temperature over 2 hours. The excess pressure was eliminated through the Schlenk line. The reactor was brought into a glove box where product was collected. Sample composition was measured by GC-FID.

Example 8: A 250 mL high pressure Parr reactor (4576 HP/HT Pressure Reactor) was loaded with 0.20 g (0.55 mmol) of $Zn(OTf)_2$ and 14.00 g (138.35 mmol) of diisopropylamine and 1.00 g of d3-acetonitrile in a glove box and then transferred to a fume hood. The reactor was connected to Teflon lined, flexible metal tubing connected to a pressurized cylinder of disilane, a cylinder of helium and a needle valve connected to a Schlenk line. All connections were pressure checked at 250 psi using helium. The reactor was then pressurized to ca. 15 psi of disilane. The reactor was then ramped over 30 minutes to 102° C. The reactor pressure reached ca. 95 psi. The reactor was then held at 102° C. for 4.5 hours. The reactor was then allowed to cool to ambient temperature overnight. The next day, the reactor was heated to 102° C. and held for 5 hours. The reactor was allowed to cool to ambient temperature over 2 hours. The final pressure was 180 psi. The excess pressure was eliminated through the Schlenk line. The reactor was brought into a glove box where a red product was collected. Sample composition was measured by GC-FID.

Example 9: A 100 mL flask connected to a reflux condenser and a thermocouple was loaded with 1.00 g of neopentasilane (NPS) and heated to reflux for 1 hour to pre-treat the glass. The contents of the flask were decanted and the glassware was rinsed with 30 mL of pentane three times. The flask was dried under vacuum. The flask was then loaded with 0.157 g of $Zn(NTf_2)_2$, 12.251 g of diisopropylamine, and 4.616 g of NPS. The flask was slowly heated to 95° C. over 1.5 hours. Gas evolution was first observed at ca. 40° C. The flask was held at 95° C. for 1 hour. The majority of the diisopropylamine was distilled off to give a mixture containing diisopropylamine-neopentasilane and bis-diisopropylamino-neopentasilane. Sample composition was measured by GC-FID.

Product composition are given in the table below. DiPA (Diisopropylamine) is always in excess.

| Ex. | Disilane (%) | DiPA (%) | DiPAS (%) | DPDS (%) | BisDiPAS (%) | BisDPDS (%) | Other (%) |
|---|---|---|---|---|---|---|---|
| 1 | 0.19 | 60.23 | 0.14 | 7.24 | 0.85 | 31.34 | Trace |
| 2 | 1.21 | 63.05 | 0.15 | 21.20 | 0.20 | 14.19 | Trace |
| 3 | 4.64 | 92.69 | 0.33 | 2.27 | 0.03 | 0.04 | Trace |
| 4 | 3.17 | 76.46 | 0.07 | 15.27 | 0.06 | 4.97 | Trace |
| 5 | 2.20 | 14.74 | 0.06 | 32.52 | 0.41 | 50.07 | Trace |
| 6 | 2.17 | 85.17 | 0 | 11.77 | 0.30 | 0.59 | Trace |
| 7 | 1.67 | 52.19 | 0.25 | 21.08 | 1.35 | 16.24 | 7.23 |
| 8 | 0.92 | 12.41 | 0.04 | 32.33 | 3.40 | 37.10 | 14.0 |

| | NPS | DiPA | DPNPS | BisDPNPS | Other |
|---|---|---|---|---|---|
| 9 | 55.81 | 8.50 | 26.54 | 3.39 | 5.76 |

Since DiPA is in excess, removing it from the integration gives the conversion values for the amino-disilanes as shown in the table below.

| Example | Disilane (%) | DiPAS (%) | DPDS (%) | BisDiPAS (%) | BisDPDS (%) | Other (%) |
|---|---|---|---|---|---|---|
| 1 | 0.48 | 0.36 | 18.21 | 2.14 | 78.82 | Trace |
| 2 | 3.23 | 0.40 | 57.38 | 0.54 | 38.41 | Trace |
| 3 | 63.54 | 4.56 | 31.00 | 0.41 | 0.49 | Trace |
| 4 | 13.47 | 0.29 | 64.88 | 0.26 | 21.10 | Trace |
| 5 | 2.58 | 0.07 | 38.14 | 0.48 | 58.73 | Trace |
| 6 | 14.63 | 0 | 79.37 | 2.04 | 3.96 | Trace |
| 7 | 3.49 | 0.52 | 44.09 | 2.82 | 33.96 | 14.88 |
| 8 | 1.10 | 0.04 | 36.92 | 3.88 | 42.37 | 15.69 |
|   | NPS | | DPNPS | | BisDPNPS | Other |
| 9 | 60.85 | | 28.94 | | 3.70 | 6.51% |

The invention claimed is:

1. A method for dehydrocoupling silanes and amines; said method comprising contacting: (a) an amine; (b) a perhydridosilane; and (c) a catalyst which is $ZnX_2$, wherein X is alkyl, chloride, bromide, iodide, trifluoromethanesulfonate, bis(trifluoromethane)sulfonamide, tosylate, methanesulfonate or $O_3S(CF_2)_xCF_3$ wherein x is a integer from 1 to 10.

2. The method of claim 1 in which the perhydridosilanes has from 1 to 10 silicon atoms.

3. The method of claim 2 in which the amine has only one hydrogen atom bonded to a nitrogen atom and has from 2 to 20 carbon atoms.

4. The method of claim 3 in which (a), (b) and (c) are heated at a temperature from 40 to 180° C.

* * * * *